United States Patent
Tillaart et al.

(10) Patent No.: US 8,375,844 B2
(45) Date of Patent: Feb. 19, 2013

(54) TWO-STAGE DOUBLE ACTING HYDRAULIC CYLINDER ASSEMBLY AND USE THEREOF IN APPARATUS FOR DIGGING AND TRANSPLANTING TREES

(75) Inventors: Marlin Tillaart, Brougham (CA); Paul Giampuzzi, Mississauga (CA)

(73) Assignee: Dutchman Industries Inc., Brougham (CA)

( * ) Notice: Subject to any disclaimer, the term of this patent is extended or adjusted under 35 U.S.C. 154(b) by 920 days.

(21) Appl. No.: 12/483,628

(22) Filed: Jun. 12, 2009

(65) Prior Publication Data
US 2009/0308243 A1  Dec. 17, 2009

Related U.S. Application Data

(60) Provisional application No. 61/061,216, filed on Jun. 13, 2008.

(51) Int. Cl.
*F15B 15/08* (2006.01)
*A01G 23/04* (2006.01)

(52) U.S. Cl. .......................... 92/117 A; 92/53
(58) Field of Classification Search ................ 92/51, 52, 92/53, 117 R, 117 A
See application file for complete search history.

(56) References Cited

U.S. PATENT DOCUMENTS

| | | | |
|---|---|---|---|
| 141,667 A | 8/1873 | Quick et al. | |
| 1,095,926 A | 5/1914 | Powell | |
| 2,634,587 A * | 4/1953 | Ptak | 92/117 A |
| 2,691,963 A | 10/1954 | Seng | |
| RE27,183 E * | 10/1971 | Rosaen | 92/117 R |
| 3,805,681 A * | 4/1974 | Wible et al. | 92/52 |
| 3,877,349 A | 4/1975 | Schindel | |
| 4,081,053 A | 3/1978 | Sherman | |
| 4,602,444 A * | 7/1986 | Endo | 111/101 |
| 4,791,854 A | 12/1988 | Banicevic | |
| 4,798,128 A | 1/1989 | Mita | |
| 5,255,591 A * | 10/1993 | Gottlieb | 92/52 |
| 5,322,004 A | 6/1994 | Sims | |
| 5,459,952 A * | 10/1995 | Tillaart et al. | 37/302 |
| 5,613,418 A | 3/1997 | Guido | |
| 5,715,614 A * | 2/1998 | Ookuwa et al. | 37/302 |
| 5,813,552 A | 9/1998 | Kaspar | |
| 6,651,546 B2 | 11/2003 | Sandlin | |
| 6,722,296 B2 * | 4/2004 | Reilly | 111/101 |
| 6,874,655 B2 | 4/2005 | Aoyama et al. | |

* cited by examiner

*Primary Examiner* — Thomas E Lazo
(74) *Attorney, Agent, or Firm* — Calfee, Halter & Griswold LLP

(57) ABSTRACT

Two-stage double-acting hydraulic cylinders are described, in which a first, inner stage includes a piston rod and head movable within a cylinder and a second, outer stage has a cylindrical body adapted to move longitudinally between stop positions intermediate the ends of the first cylinder. The two stages are hydraulically linked to each other through the alternate introduction of hydraulic fluid selectively through an extension pressure fluid port and a retraction pressure fluid port a limited motion of the outer stage is obtained in a power stroke. Hydraulic power means of this kind is of particular value in powered apparatus for digging and transplanting trees, where minimization of the overall height of the apparatus is desirable.

7 Claims, 5 Drawing Sheets

TWO-STAGE DOUBLE ACTING HYDRAULIC CYLINDER ASSEMBLY AND USE THEREOF IN APPARATUS FOR DIGGING AND TRANSPLANTING TREES

RELATED APPLICATION

This application replaces and claims priority from, and any other benefit of, U.S. Provisional application No. 61/061,216 filed on Jun. 13, 2008 and entitled Two-Stage Double Acting Hydraulic Cylinder Assembly and Use Thereof in Apparatus for Digging and Transplanting Trees.

FIELD OF THE INVENTION

The present invention is directed to a novel two-stage double acting cylinder which is shorter when fully extended than conventional multiple-stage double-acting cylinders, for a given action stroke. This and other features are particularly useful in power means for actuating the sliding spade assemblies of known apparatus for digging and transplanting trees.

BACKGROUND OF THE INVENTION

We recognize that it is desirable to construct apparatus for digging and transplanting trees, commonly and hereinafter referred to as "tree spades", having the lowest possible overall height, consistent with effective digging power, since the vehicle-mounted apparatus must manoeuvre through orchards and facilities in which the frame-mounted towers carrying the extended sliding spade assemblies should avoid lower tree branches.

In one known example of apparatus for digging and transplanting trees [U.S. Pat. No. 5,459,952 (Tillaart et al.)], a multi-sided or circular frame for encircling a tree to be transplanted has mounted thereto a plurality of angularly upwardly extending towers, each including a sliding spade assembly. Each sliding spade assembly is pulled down the tower in the digging stroke, by powered retraction of hydraulic cylinders coaxially affixed to each incorporated by reference for its description and illustrations of example of tree spade apparatus of a kind in which a hydraulic cylinder assembly according to the present invention is advantageous.

A number of designs for multiple-stage hydraulic cylinder and piston assemblies are known for use as actuators in a wide variety of lifting, digging and hammering apparatus. Telescopic constructions of cylinder and piston are adapted to collapse when retracted to a short configuration and to be extended to secure a desired length of travel. Examples are afforded by U.S. Pat. No. 1,095,926 (Powell) and U.S. Pat. No. 5,322,004.

A number of "double-acting" telescopic cylinder assemblies have been devised for a range of applications. In assemblies of this kind, fluid pressure is applied to each of the telescopically associated parts in either direction of movement. One such cylinder assembly is described in U.S. Pat. No. 2,691,963 (Seng), intended for installation in bulldozers, cranes, power shovels and the like. U.S. Pat. No. 5,613,418 (Guido) describes a three-stage hydraulic lifting cylinder in which the first stage is in the form of a hollow-piston cylinder with a cylinder tube, a piston and a piston rod. The piston rod is hollow and accommodates a telescoping cylinder in the form of two long-stroke cylinders. The hollow piston rod and the telescoping cylinders include stops for limiting the stroke travelled by the two telescoping cylinders.

Telescoping hydraulic cylinders are generally constructed with the aim of obtaining a large elongation in comparison with the collapsed or retracted length of the assembly. For this reason, they are not ideal for actuating the digging blades of a tree transplanting apparatus, in which the digging stroke involves retraction of the cylinder. For that application it would be desirable to limit the extended height of the blade assemblies as much as possible for the given digging stroke distance.

Moreover, with conventional double-acting multi-stage telescoping cylinders, the high back pressures encountered lead to energy inefficiency and potential mechanical problems if used to actuate tree transplanter apparatus.

OBJECTS AND SUMMARY OF INVENTION

It is a first object of the present invention to provide a two-stage double acting cylinder of such a configuration that the cylinder is shorter when extended than other multiple stage double acting cylinders of equal stroke.

It is a further object of this invention to provide such a cylinder assembly, in which the back pressure associated with the rapid removal of large volumes of fluid from the cylinder in the compression/retraction stroke is minimized.

It is a still further object of this invention to provide such a cylinder assembly, which in use maintains a relatively constant force and linear extension/retraction speed over both cylinder stages.

With a view to achieving these objectives, particularly in order to provide cylinder assemblies for actuating a tree spade, the invention is directed in one aspect thereof, to a two-stage double-acting cylinder comprising a first, inner stage including a piston rod and head moveable within a cylinder; and a second, outer stage having a cylindrical body adapted to move longitudinally between stop positions intermediate the ends of the first cylinder. The two stages are hydraulically linked to each other. Hydraulic fluid is alternately introduced through either an extension pressure fluid port or a retraction pressure fluid port. Motion of the outer stage is typically limited to a linear displacement half the stroke of the inner stage.

In a further aspect, the invention is directed to an improvement in apparatus for digging and transplanting trees of the kind in which an assembly of reciprocating blades is adapted to converge into the ground surrounding a tree. The improvement comprises the use of hydraulic drive means incorporating double-acting hydraulic cylinder assemblies according to the present invention, to achieve the desired objective of minimizing the overall height of the tree spade while maintaining digging efficiency and power.

BRIEF DESCRIPTION OF THE DRAWINGS

Embodiments of the invention will be described with reference to the attached drawings, in which.

DESCRIPTION OF PREFERRED AND ALTERNATIVE EMBODIMENTS

Figure 1A:
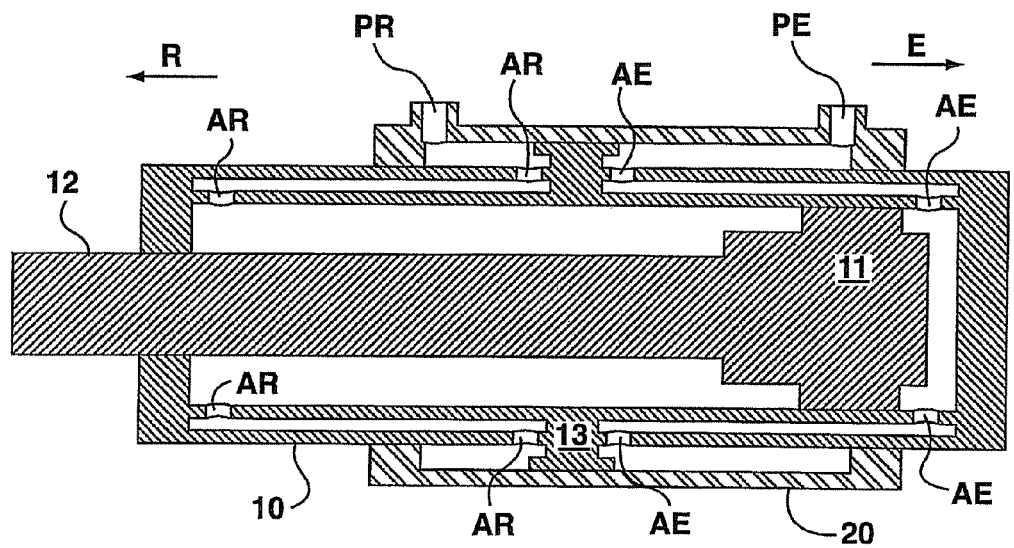
FIGS. 1A and 1B are schematic cross-sectional views of two variations on a design of cylinder assembly according to the invention, differing from each other in their respective porting configurations for the introduction and removal of hydraulic fluid.

The accompanying drawings illustrate three general design arrangements of cylinder assemblies answering to the present invention. For clarity and simplicity, the same reference numeral will be used in all representations for functionally corresponding components of the cylinder assemblies. In each of our two-stage double acting cylinders, reference numeral 10 denotes the inner cylinder ("first stage") which is the longer in stroke of the two stages. Reference numeral 20 refers to the outer cylinder ("second stage") which moves along the outer wall of the first stage.

Second Stage as Bore of Double Rod Cylinder

Figure 1B:
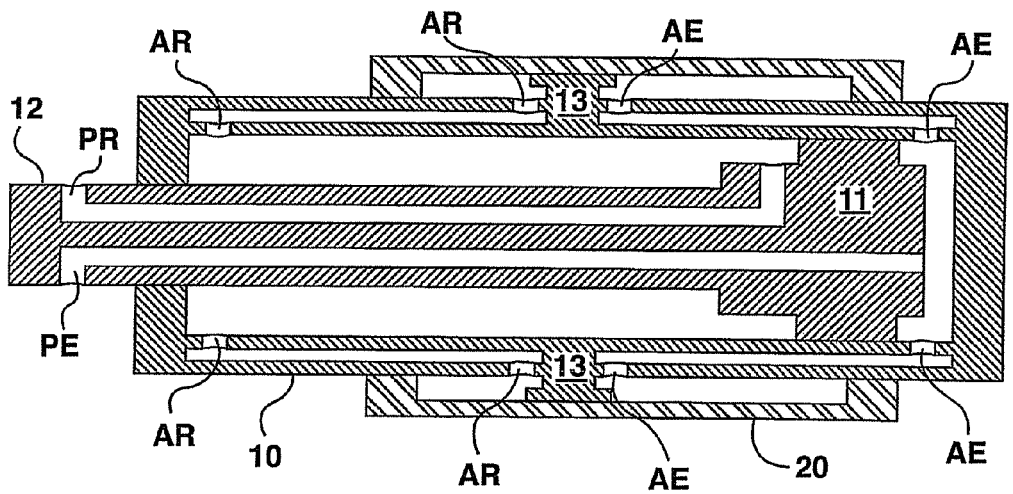

This configuration is illustrated in FIGS. 1A and 1B. First stage 10 has a cylindrical bore which accommodates a piston with piston head 11 and integral piston rod 12. Cylindrical second stage 20 surrounds the first stage 10 and translates along the length thereof as a shuttle tube, in the direction of arrow E when extending and arrow R when retracting, relative to the first stage.

The second stage is actuated hydraulically and is linked to the fluid supplied to the first stage, by interior apertures $A_E$ for the extension stroke and apertures $A_R$ for the retraction stroke. The range of travel of outer stage 20 along inner stage 10 is limited by stop means 13 integral with the outer body of first stage 10.

In the design of FIG. 1A, porting is located on the second stage through hydraulic pressure inlet $P_E$, for extension of piston rod 12 and through second stage 20 and hydraulic pressure inlet $P_R$, for the retraction of the piston rod and second stage. When the piston is being extended, $P_R$ serves as the outlet for hydraulic fluid going through the assembly and when the cylinder is being retracted, $P_E$ serves as the outlet for hydraulic fluid.

For reasons of convenience in operation, rod end porting is currently preferred over porting installed on the second stage of hydraulic cylinder assemblies according to the invention. In drawings illustrating the two other arrangements described below, porting is carried out through the rod end, as in FIG. 1B.

Second Stage Actuated by Coaxial Double-Acting Cylinder

Figure 2A:
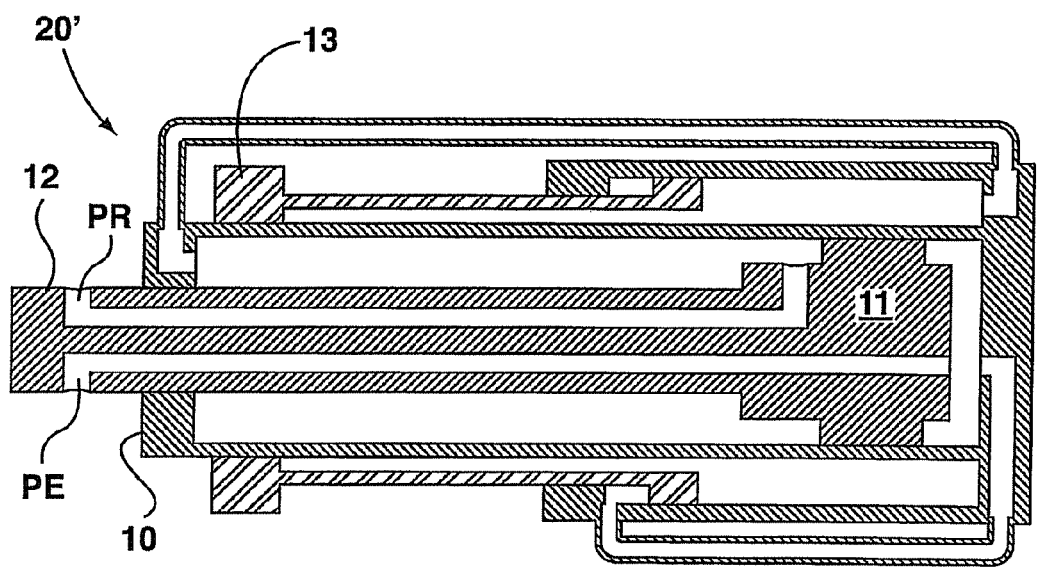
FIGS. 2A and 2B are schematic cross-sectional views of two variations on a second design of cylinder assembly according to the invention, in which the second, outer stage of the assembly is actuated by a conventional coaxial double acting cylinder surrounding the first stage.
Figure 2B:
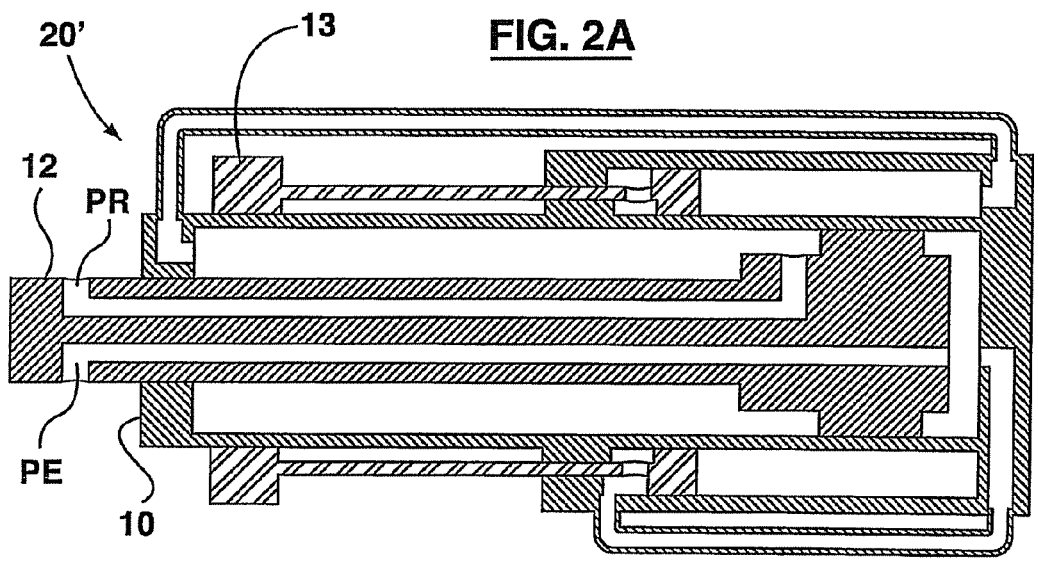

This arrangement is illustrated in FIGS. 2A and 2B. The shuttle-tube construction of second stage cylinder, as in FIGS. 1A and 1B, has been replaced by a coaxial double-acting cylinder surrounding the first stage 10. In FIG. 2A, a simple design of such coaxial double-acting cylinder second stage is indicated as 20'. In FIG. 2B, a more elaborate arrangement provides for an additional area of retraction on the second stage.

Second Stage Actuated by External Double-Acting Cylinder

Figure 3:
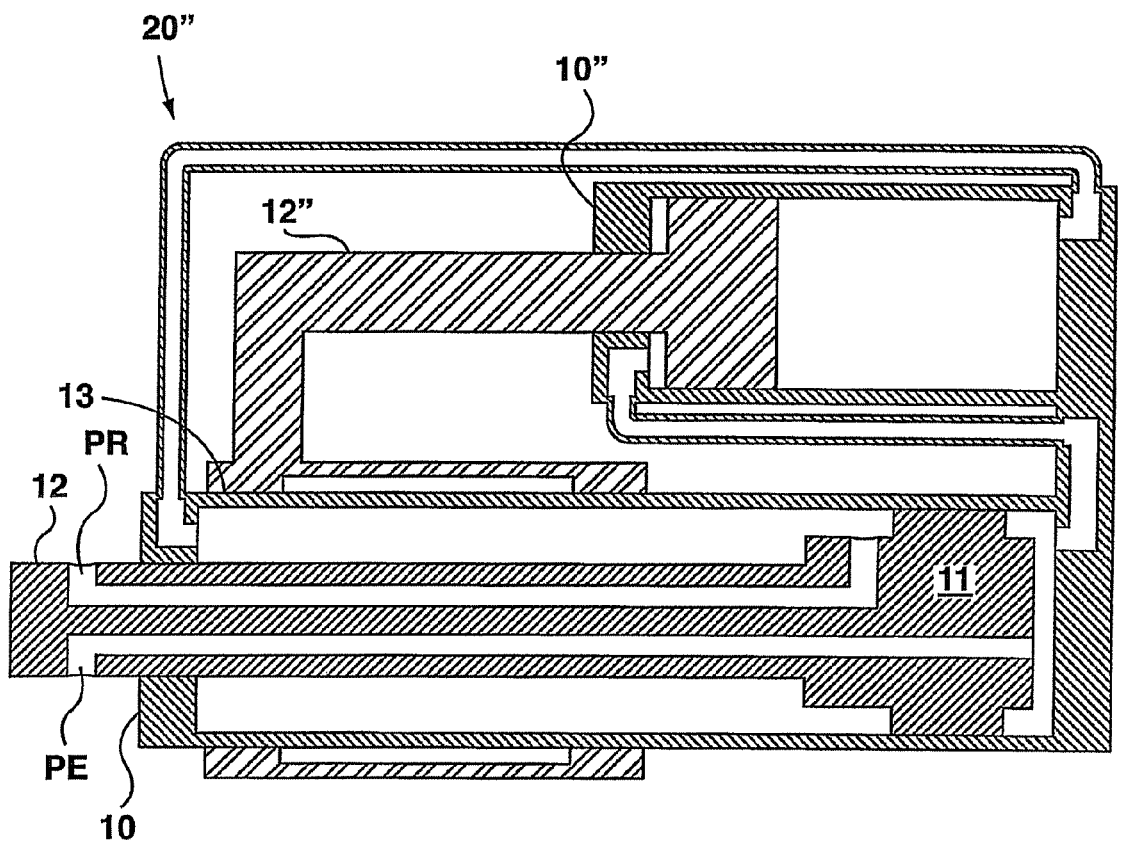
FIG. 3 illustrate in schematic cross-sectional view a third configuration of cylinder assembly according to the present invention, in which the second stage is actuated by an external double-acting cylinder.

This embodiment of the invention is illustrated in FIGS. 3A and 3B. The second stage 20" is itself constructed as a double-acting cylinder with cylinder bore 10" and piston rod 12". It will be appreciated that external cylinder 20 in arrangements of this kind may be mechanically connected to second stage 20 in a number of ways. In the arrangement shown, external cylinder 20" is mechanically connected to the large stage 20 of the main cylinder at the rod end, but the external cylinder could be mechanically connected to the bore of the cylinder.

Use to Actuate Blades of Tree Transplanting Apparatus

The double acting hydraulic power systems according to the present invention are, as noted above of particular utility in hydraulically powered apparatus for digging and transplanting trees. There are many transplanting devices commercially available of the kind in which an assembly of reciprocating blades is adapted to converge into the ground surrounding the plant, so as to form a "rootball", a well-formed excavated portion of the roots together with the earth in which they are imbedded.

A non-limiting example of the use of double-acting cylinders will now be described in connection with the apparatus of the present assignee's aforementioned U.S. Pat. No. 5,459,952 to which may be had for details of this known construction.

Figure 4A:
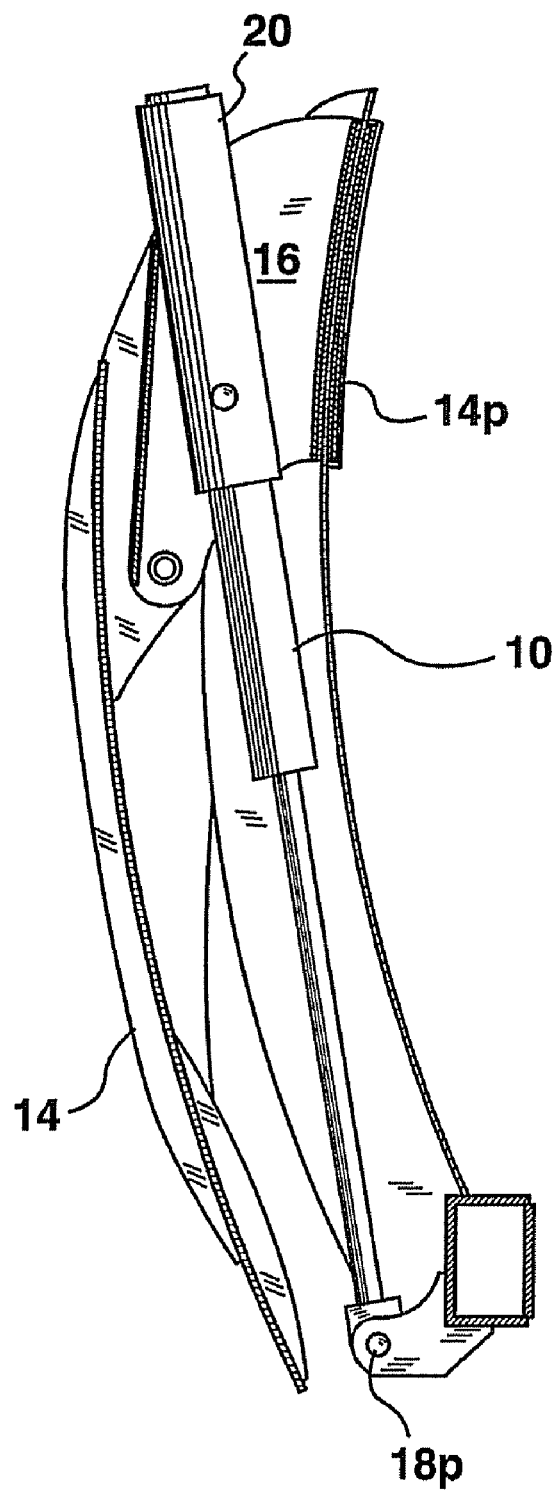
FIGS. 4A and 4B schematically illustrate the installation of a "pull-down" hydraulic cylinder according to the invention on a single blade assembly of a tree transplanting apparatus, respectively in the extended configuration of the cylinder (blade of spade up/retracted) and the retracted configuration of the cylinder (blade of spade down/extended).
Figure 4B:
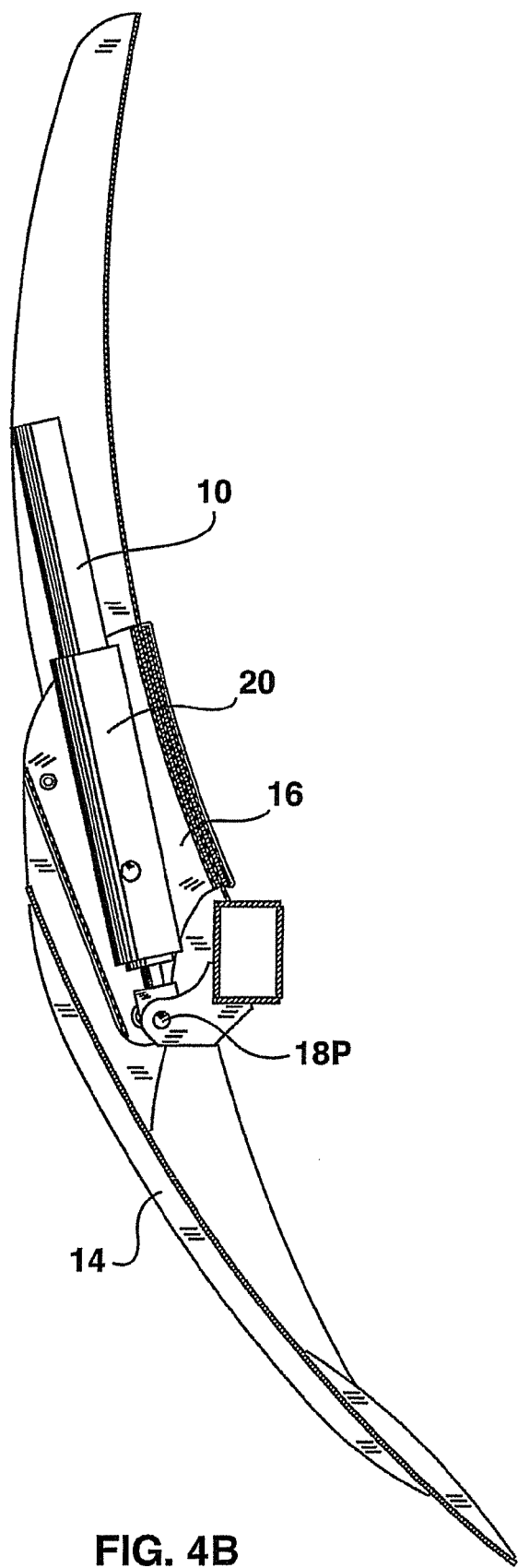

FIGS. 4A and 4B illustrate a spade blade 14 slideably mounted on an arcuate thrust tube for reciprocating movement along with driven slide member 16. Reference may be made to aforementioned U.S. Pat. No. 5,459,952 for details of this known construction.

A hydraulic cylinder assembly according to the present invention, comprising first stage 10 with its associated piston rod 12 and second outer stage 20 is pivotably mounted to the spade blade 14 at pivot $14_p$ and to the base of the thrust tube at trunnion $815_p$.

FIG. 4A shows the cylinder assembly in its extended position with the blade drawn up and away from the ground at its maximum height and FIG. 4B illustrates the configuration in which the blade has been fully extended down by complete retraction of the hydraulic assembly.

The configurations of hydraulic cylinder means according to the invention are not intended to be limitative. This aspect of the invention is characterized by utilizing a two-stage double-acting cylinder in an arrangement in which the larger stage surrounds the bore of the small stage and translates within the limits of the small bore. Further in cylinder assemblies embodying that inventive concept, there are several options for porting the cylinder and linking the two stages together. The cylinder is not limited to the hydraulic connection shown in the drawings. Any combination of hosing, line tubes, internal passages and the like could be used to actuate the cylinder and link the stages in a functionally equivalent manner.

The use according to the invention of such hydraulic assemblies in apparatus for digging and transplanting trees has been exemplified by illustrating the operation of cylinders according to the invention in a particular tree spade apparatus. This, too, is not intended to be limitative, as two-stage double acting hydraulic cylinder assemblies according to the invention may advantageously be used in any hydraulically powered apparatus for digging and transplanting trees.

It will therefore be appreciated that the invention is not to be limited to its preferred embodiments described herein, since modifications and adaptations can be made thereto which are within the scope of the invention as defined by the appended claims and equivalents thereof.

We claim:

1. A two-stage double acting cylinder assembly, comprising:
    a first stage comprising a first cylinder and a piston with a head inside said first cylinder and internal piston rod extending outwardly of the assembly;
    a second stage, comprising a second cylinder shorter than said first cylinder, having an internal diameter configured to receive said first cylinder in slidable engagement;

stopping means associated with said first cylinder to restrict the range of longitudinal travel of the second cylinder to a predetermined degree;

external and internal porting means for supplying hydraulic fluid for retraction or extension of said first and second cylinders, wherein the internal porting means and external porting means communicate to hydraulically link the first stage and the second stage.

2. A cylinder assembly according to claim 1, wherein said external porting means comprises a hydraulic pressure inlet and a hydraulic pressure outlet on said second cylinder.

3. A cylinder assembly according to claim 1, wherein said external porting means comprises a hydraulic pressure inlet and a hydraulic pressure outlet on said piston rod outside said second cylinder.

4. In an apparatus for digging and transplanting trees, of the kind including a plurality of spade assemblies actuated by power means for reciprocating movement, the improvement wherein power from said power means is transmitted to said spade assemblies by a plurality of two-stage double acting cylinder assemblies according to claim 1.

5. A two-stage double acting cylinder assembly, comprising:

a first stage comprising a first cylinder and a piston with a head inside said first cylinder and internal piston rod extending outwardly of the assembly;

a second stage, comprising a second cylinder shorter than said first cylinder, having an internal diameter configured to receive said first cylinder in slidable engagement;

a travel limiter associated with said first cylinder to restrict the range of longitudinal travel of the second cylinder to a predetermined degree;

external fluid ports in communication with one of the first cylinder and second cylinder for supplying hydraulic fluid for retraction or extension thereof, and further fluid ports communicating between the first cylinder and the second cylinder supplying hydraulic fluid for retraction or extension of the other of the first cylinder and second cylinder and hydraulically linking the first and second stages together.

6. A cylinder assembly according to claim 5, wherein said external fluid ports comprises a hydraulic pressure inlet and a hydraulic pressure outlet on said piston rod outside said second cylinder and are in fluid communication with the first cylinder.

7. A cylinder assembly according to claim 5 in an apparatus for digging and transplanting trees, the apparatus including a spade assembly wherein power is transmitted to said spade assembly by the cylinder assembly.

* * * * *